United States Patent [19]

Merriken et al.

[11] Patent Number: 5,042,901
[45] Date of Patent: Aug. 27, 1991

[54] PRECONNECTORIZED OPTICAL SPLICE CLOSURE

[75] Inventors: James R. Merriken, Hudson; Rainer M. Zimmer, Hickory, both of N.C.

[73] Assignee: Siecor Corporation, Hickory, N.C.

[21] Appl. No.: 560,202

[22] Filed: Jul. 31, 1990

[51] Int. Cl.⁵ .............................................. G02B 6/36
[52] U.S. Cl. ................................................... 385/135
[58] Field of Search .............. 350/96.20, 96.21, 96.22, 350/96.23

[56] References Cited

U.S. PATENT DOCUMENTS

| | | | |
|---|---|---|---|
| 4,332,435 | 6/1982 | Post | 350/96.20 |
| 4,359,262 | 11/1982 | Dolan | 350/96.20 |
| 4,428,645 | 1/1984 | Korbelak et al. | 350/96.20 |
| 4,666,240 | 5/1987 | Caron et al. | 350/96.20 |
| 4,685,764 | 8/1987 | Hoffer et al. | 350/96.20 |
| 4,799,757 | 1/1989 | Goetter | 350/96.20 |
| 4,805,979 | 2/1989 | Bossard et al. | 350/96.20 |

OTHER PUBLICATIONS

Siecor Installation Procedure SIP 003-006, Issue No. 1, Nov. 1986 (12 pp.).

*Primary Examiner*—John D. Lee
*Attorney, Agent, or Firm*—J. David Abernethy

[57] ABSTRACT

A watertight fiber optic splice closure has a passage in an end wall which is closed by a plug. A preconnectorized optical connector sleeve is mounted to be accessible from the passage, so that an outside optical fiber may be connected to a drop fiber without dismantling the closure.

4 Claims, 3 Drawing Sheets

PRECONNECTORIZED OPTICAL SPLICE CLOSURE

BACKGROUND OF THE INVENTION

Because the presence of water in a splice of optical fibers must be avoided, optical splices in outdoor environments, such as manholes or the like, are commonly housed in waterproof containers called splice closures. Waterproof splice closures often have a cylindrical shape, with disc-shaped end caps mounted on either side of two rectangular metal supporting bars. A splice tray, sometimes called a splice organizer, is in the interior of the closure. A cylindrical cover is between the end caps. Closures of this type are illustrated in U.S. Pat. Nos. 4,666,240 and 4,685,764. If two cables enter the same end cap to be spliced, the closure configuration is of a "butt" type. If cables enter at opposing ends for splicing, a "through" type closure results. In either case, a hole is already present or drilled in an end cap to allow cable entry. The hole must then be sealed; sealing pastes and tapes are available for this purpose. A hole must be drilled and sealed for each cable that enters the closure. The end caps, and sometimes the cover, are often in halves which must be joined. To "drop off" an optical fiber, a good deal of time must be consumed in splicing, drilling, and sealing. This process must be repeated if the splicing connections are changed.

SUMMARY OF THE INVENTION

The improved fiber optic splice closure according to the invention offers the convenience of using fiber optic connectors in an outdoor environment. Fiber optic connectors, such as FC or the like, allow the user to quickly connect and disconnect optical fibers from each other, and so they are commonly used in indoor optical wiring centers. As used in the claims, fiber optic connectors includes mechanical splices.

The improved closure modifies the traditional outdoor splice closure, which is a watertight container containing a fiber optic splice tray. A fiber optic cable is introduced into one end and its optical fibers are placed in the splice tray. Then one or more optical fibers are spliced in the splice tray at one end, and a first fiber optic connector and a connector sleeve are placed at the other end of the optical fiber in the splice closure. A housing having a passage therein is mounted to a passage drilled in an exterior wall of the watertight container. Then the craftsperson needs only to withdraw the connector sleeve, attach another connectorized optical fiber to the connector sleeve, insert the now joined pair of optical connectors into the closure, and plug the closure using a plug allowing the connected optical fiber to exit the closure. The task of replacing the connected outside optical fiber could well be performed by one having only minimal training, since none of the usual taping and sealing would be needed, or at most a minimal amount. The major steps of boring and connecting the closure together would not need to be repeated.

BRIEF DESCRIPTION OF THE DRAWINGS

The detailed description of the preferred embodiment is made with reference to the drawings, of which.

DETAILED DESCRIPTION OF THE PREFERRED EMBODIMENT

Figure 1:
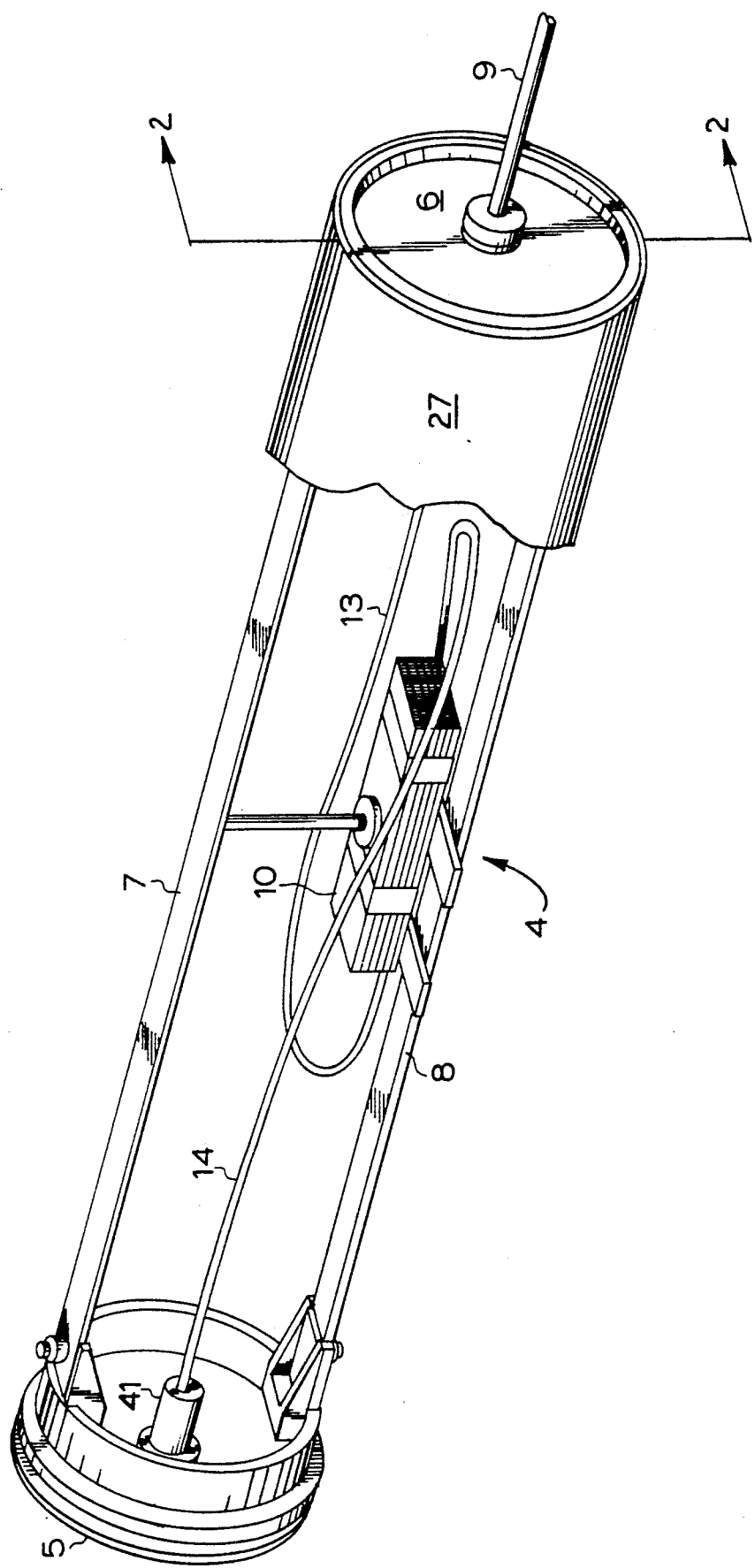
FIG. 1 is a perspective view of the splice closure with the exterior shell partially cut away.

The improved watertight splice closure 4 in FIG. 1 has as its exterior walls cylindrical shell 27, partially cut away to show internal features, and disc-shaped end walls 5, 6. Rectangular metal supporting bars 7, 8 provide internal support and grounding. Optical cable 41 is shown entering the closure through end wall 5 in the conventional manner. Cable 41 will be secured by securing its exterior jacket, strength members, or both. For clarity, only one optical fiber 14 is shown mounted to splice tray 10, but ordinarily there will be a plurality of such fibers. Also mounted to splice tray 10 and optically connected to optical fiber 14 is optical fiber 13. Another jacketed optical fiber 9 is shown exiting the closure through end wall 6.

Figure 2:
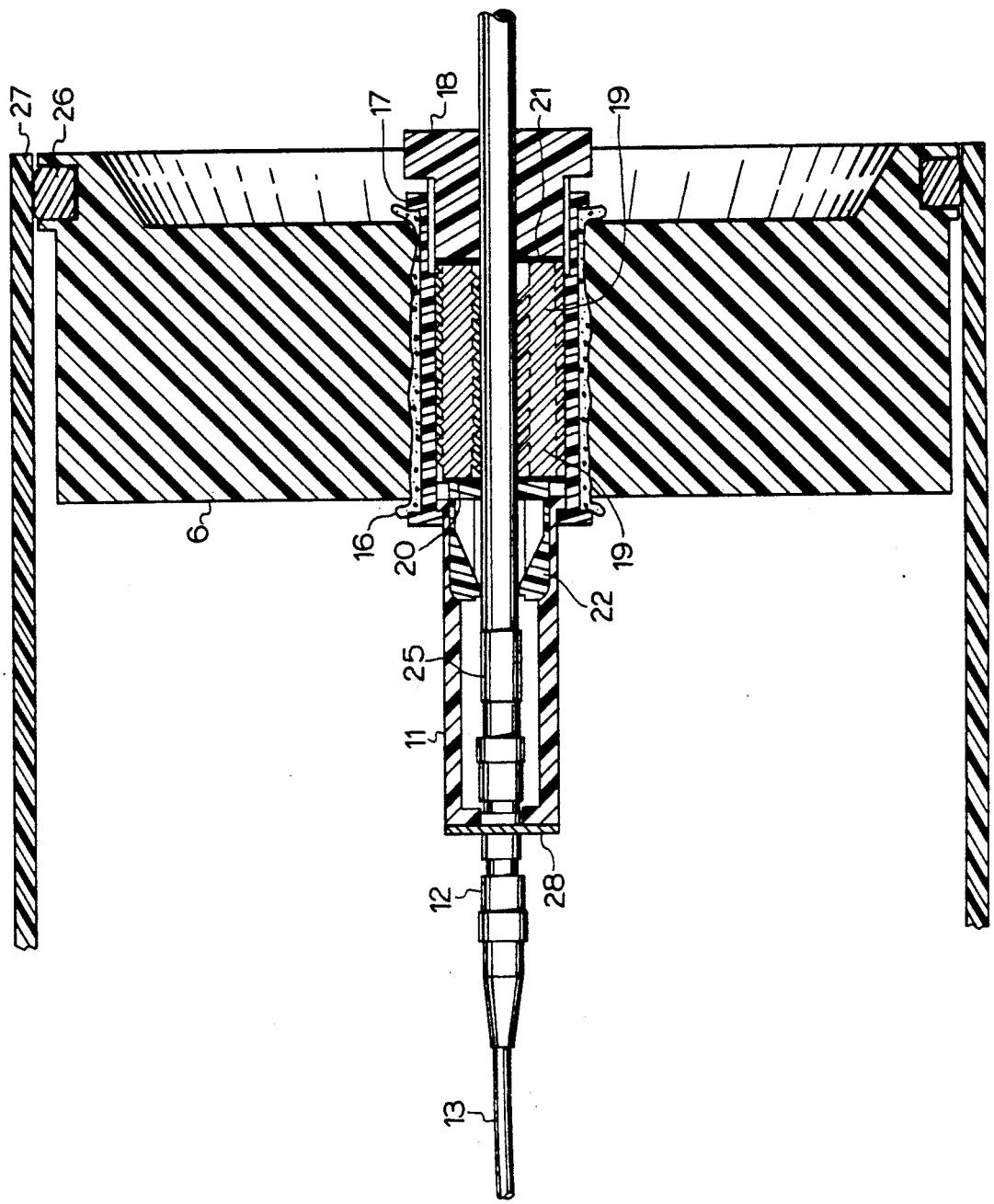
FIG. 2 is an expanded longitudinal sectional view along line 2—2 of FIG. 1; and, FIG. 3 is the same view as FIG. 2 with the components isolated for clear comprehension.
Figure 3:
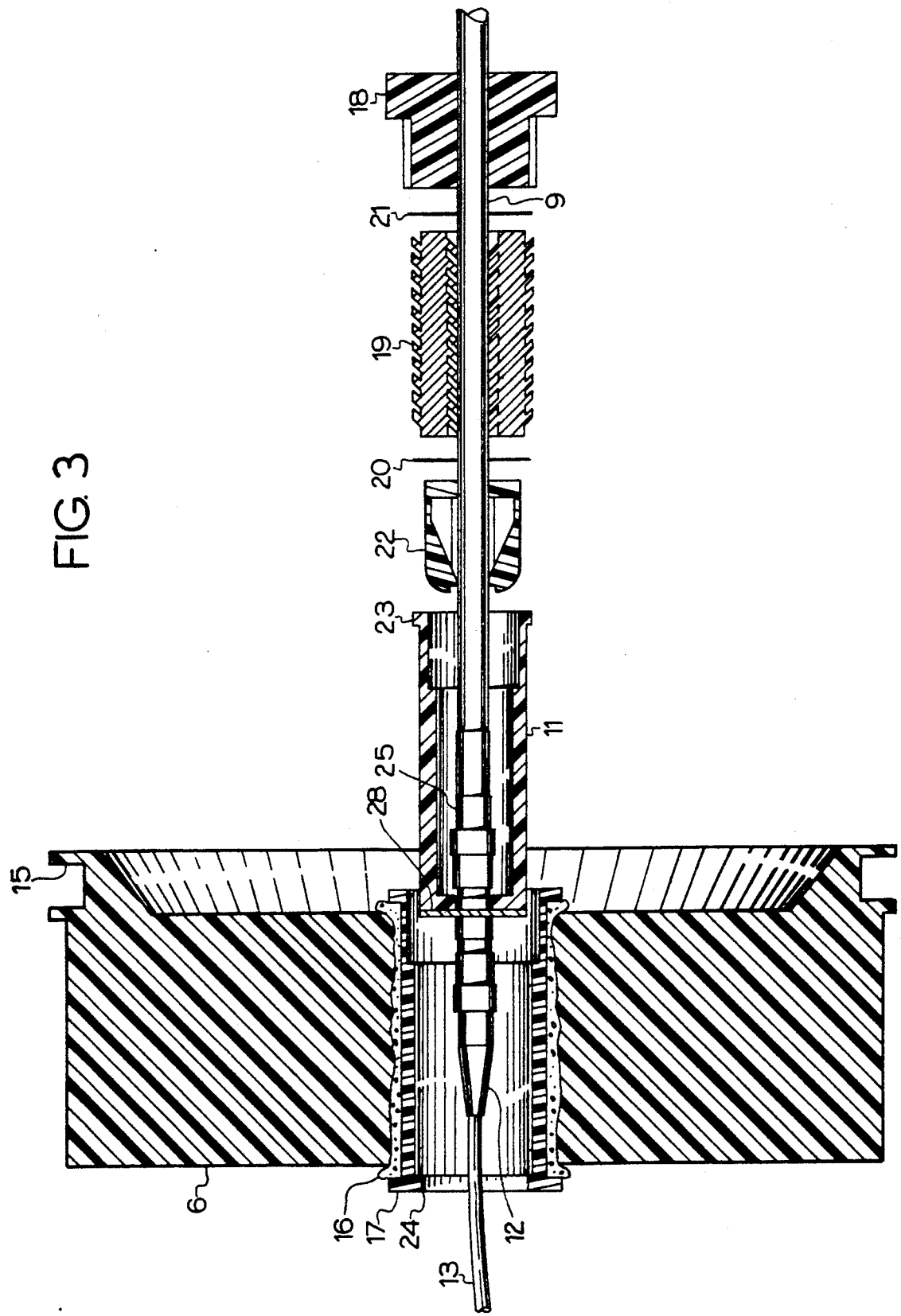

Turning to FIGS. 2 and 3, optical fiber 13 is optically connected to first fiber optic connector 12, which is in turn connected to optical connector sleeve 28. Optical connector sleeve 28 is mounted by screws or the like to the tubular housing 11, which has a passage therein containing second optical connector 25 and cable clamp 22.

Jacketed optical fiber 9 is terminated by second optical connector 25, which is optically connected to first optical connector 12 by optical connector sleeve 28.

End wall 6 has groove 15 containing 0-ring 26, providing a watertight seal to container 27. End wall 6 is breached by tube 17, which is secured to end wall 6 by B sealant tape 16. Tube 17 has a passage therein through which jacketed optical fiber 9 exits. Tube 17 contains sealing grommet 19, washers 20, 21 on opposite ends of grommet 19, and plug 18. Tube 17 and tubular housing 11 have flanges 24, 23 which block each other to keep tubular housing 11 accessible to the craftsperson making a new connection at a later time. A plurality of preconnectorized drop fibers may exit the closure in the same manner.

What is claimed is:

1. A fiber optic splice closure comprising:
   (a) a watertight container comprising a first exterior wall having a passage therein;
   (b) a removable plug for the passage in the first exterior wall;
   (c) a fiber optic splice tray in the container;
   (d) a first optical fiber mounted to the splice tray;
   (e) a first optical connector connected to the first optical fiber; and,
   (f) connection means for physically connecting the first optical connector with the first exterior wall, whereby, after removal of the plug, a second optical connector may be at least partially inserted through the passage in the first exterior wall and optically connected to the first optical connector.

2. A fiber optic splice closure as recited in claim 1, the connection means comprising an optical connector sleeve mounted to the first optical connector.

3. A fiber optic splice closure as recited in claim 2, the connection means further comprising a housing having a passage therein mounted to the first optical connector sleeve.

4. A fiber optic splice closure as recited in claim 3, the connection means further comprising blocking flanges on the housing and the first exterior wall.

* * * * *